(12) United States Patent
Kim

(10) Patent No.: US 9,405,412 B2
(45) Date of Patent: Aug. 2, 2016

(54) DISPLAY DEVICE AND DRIVING METHOD THEREOF

(71) Applicant: LG DISPLAY CO., LTD., Seoul (KR)

(72) Inventor: MinSung Kim, Seoul (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 14/075,836

(22) Filed: Nov. 8, 2013

(65) Prior Publication Data

US 2014/0132559 A1 May 15, 2014

(30) Foreign Application Priority Data

Nov. 12, 2012 (KR) .................. 10-2012-0127354

(51) Int. Cl.
*G06F 3/044* (2006.01)
*G06F 3/041* (2006.01)

(52) U.S. Cl.
CPC .............. *G06F 3/044* (2013.01); *G06F 3/0416* (2013.01)

(58) Field of Classification Search
CPC ............................... G06F 3/044; G06F 3/0416
USPC ........... 345/173–183, 104; 178/18.01–18.03, 178/18.05–18.09, 19.01–19.05; 324/679, 324/686
See application file for complete search history.

(56) References Cited

U.S. PATENT DOCUMENTS

| 8,525,799 B1* | 9/2013 | Grivna | G06F 3/0416 345/173 |
|---|---|---|---|
| 2008/0150905 A1* | 6/2008 | Grivna | G06F 3/016 345/173 |
| 2010/0201382 A1 | 8/2010 | Welland | |
| 2011/0175847 A1* | 7/2011 | Wang | G06F 3/044 345/174 |
| 2011/0216031 A1 | 9/2011 | Chen et al. | |
| 2011/0247884 A1* | 10/2011 | Kim et al. | 178/18.03 |
| 2011/0273193 A1 | 11/2011 | Huang et al. | |
| 2011/0279131 A1* | 11/2011 | Kim et al. | 324/679 |
| 2012/0026126 A1* | 2/2012 | Park et al. | 345/174 |
| 2012/0050213 A1* | 3/2012 | Bokma | 345/174 |
| 2012/0092296 A1* | 4/2012 | Yanase | G06F 3/0416 345/174 |
| 2012/0105371 A1* | 5/2012 | Hotelling et al. | 345/174 |
| 2012/0217982 A1* | 8/2012 | Narayanasamy | H03K 17/962 324/686 |
| 2012/0256869 A1 | 10/2012 | Walsh et al. | |
| 2013/0093706 A1* | 4/2013 | Kurasawa | G06F 3/0412 345/173 |
| 2013/0141139 A1* | 6/2013 | Ballan et al. | 327/51 |
| 2013/0169340 A1* | 7/2013 | Tao et al. | 327/336 |

FOREIGN PATENT DOCUMENTS

| CN | 101833044 A | 9/2010 | |
| JP | 2009-169697 A * | 7/2009 | G06F 3/041 |

* cited by examiner

*Primary Examiner* — Lun-Yi Lao
*Assistant Examiner* — Kelly B Hegarty
(74) *Attorney, Agent, or Firm* — Birch, Stewart, Kolasch & Birch, LLP

(57) ABSTRACT

Discussed is a display device. The display device includes a panel in which a self-capacitive touch panel including a plurality of touch electrodes is built, and a touch sensing unit configured to, during a touch sensing period in one frame period, supply a current to the touch electrodes, hold touch voltages of the respective touch electrodes when an average voltage of the touch electrodes reaches a predetermined reference voltage, and compare each of the touch voltages with a slope voltage to determine whether each of the touch electrodes is touched while the touch voltages are being held.

10 Claims, 8 Drawing Sheets

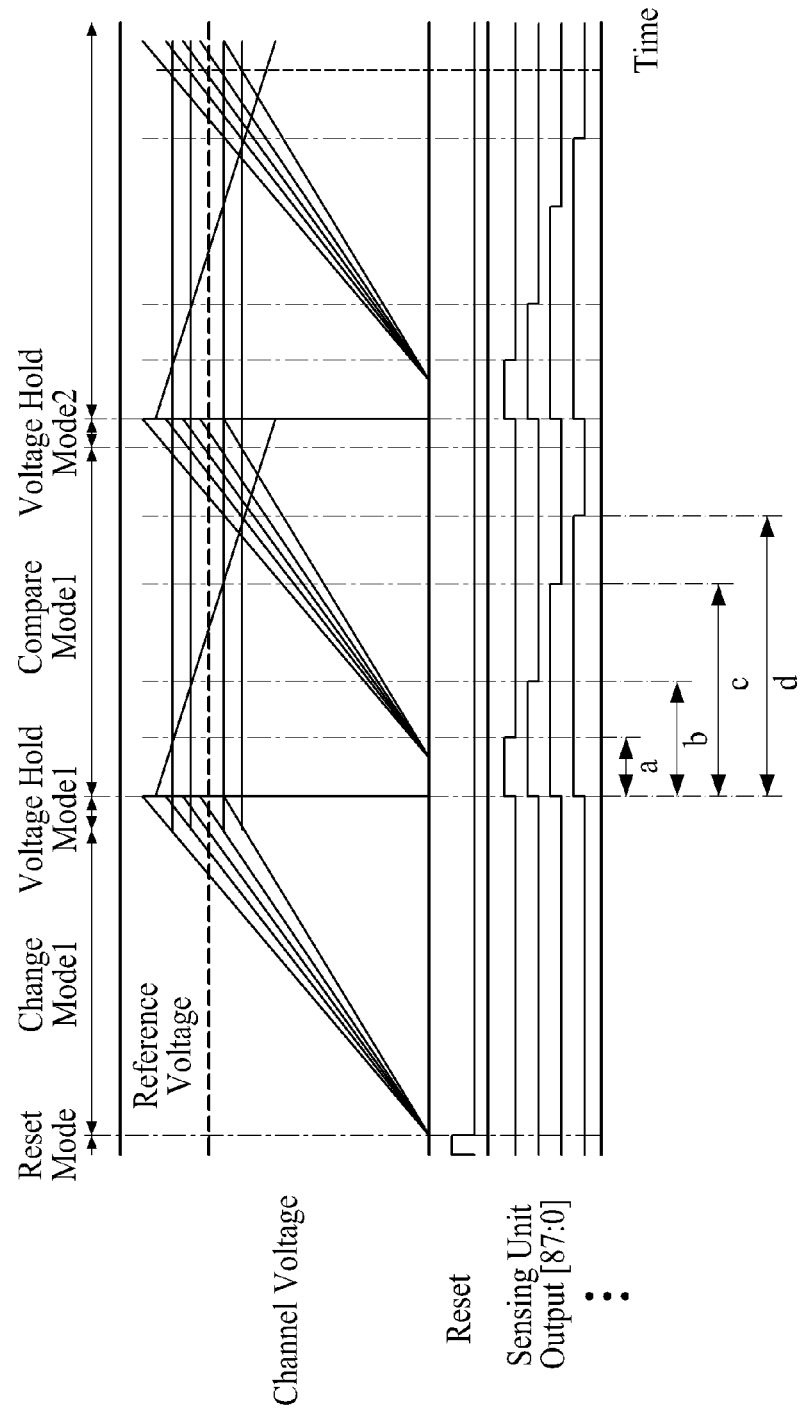

DISPLAY DEVICE AND DRIVING METHOD THEREOF

CROSS-REFERENCE TO RELATED APPLICATIONS

This application claims the benefit of the Korean Patent Application No. 10-2012-0127354 filed on Nov. 12, 2012, which is hereby incorporated by reference as if fully set forth herein.

BACKGROUND

1. Field of the Invention

The present invention relates to a display device, and more particularly, to a display device with a built-in self-capacitive touch panel.

2. Discussion of the Related Art

With the advance of various portable electronic devices such as mobile terminals and notebook computers, the demand for flat panel display devices applied to the portable electronic devices is increasing.

In such FPD devices, the application fields of the LCD devices are being continuously expanded because the LCD devices are easily manufactured due to the advance of manufacturing technology and realize a drivability of a driver, a high-quality image, and a large screen.

Instead of an input device such as a mouse or a keyboard which is conventionally applied to LCD devices, a touch screen that enables a user to directly input information with a finger or a pen is recently applied as an input device to LCD devices.

As types in which a touch panel is provided at a liquid crystal panel, there are an on-cell type, an in-cell type, and a hybrid in-cell type. LCD devices using the in-cell type or the hybrid in-cell type are called LCD devices with a built-in touch panel.

FIG. 1 is an exemplary diagram illustrating a configuration of a related art LCD device, and FIG. 2 is an exemplary diagram showing a timing at which a common voltage and a driving pulse are applied to a touch electrode in the related art LCD device.

The related art LCD device with a built-in touch panel, as illustrated in FIG. 1, includes a liquid crystal panel 10 with a built-in touch panel 60 and a touch sensing unit 30 for driving the touch panel 60. A method of driving the touch panel 60 includes a resistive type and a capacitive type. The capacitive type is categorized into a self-capacitive type and a mutual type.

In the related art LCD device using the self-capacitive type of the types, as illustrated in FIG. 1, a touch electrode line 62 is separately extended from each of a plurality of touch electrodes 61, and "q×p=n" number of sensors 31 are needed in consideration of the number "q" of widthwise touch electrodes and the number "p" of lengthwise touch electrodes. When the number of sensors 31 is small, the touch sensing unit 30 itself may be configured as one integrated circuit (IC), and when many sensors are needed, a plurality of ICs (touch ICs) configured with a plurality of the sensors 31 may configure the touch sensing unit 30.

In the above-described LCD device with the built-in self-capacitive touch panel, since a touch electrode receiving a driving pulse is used as a common electrode, an output of an image and touch sensing cannot simultaneously be performed. Therefore, as shown in FIG. 2, one frame period determined by a vertical sync signal Vsync is divided into a display period and a touch sensing period.

Each of the sensors 31 applies ten or more driving pulses to the touch electrode 61 during the touch sensing period, and analyzes a sensing signal received from the touch electrode to determine whether a corresponding touch electrode is touched.

Generally, in the self-capacitive type, determining whether there is a touch uses charging or discharging of the driving pulse. That is, in the self-capacitive type, a touch is detected by using a voltage slope change caused by a change in a capacitance value which occurs between when there is a touch and when there is no touch FIG. 3 is a graph for describing a method of determining a touch in a related art display device using the self-capacitive type.

In the self-capacitive type, a relaxation oscillation type is being widely used.

In the relaxation oscillation type, a sensing time is decided based on a self-capacitance value and the number of charging and discharging.

In the relaxation oscillation type, a time decided based on a self-capacitance value is counted with a clock generated from a reference oscillator.

In the relaxation oscillation type, a digital code value can be obtained by counting a decided time with a clock generated from the reference oscillator.

However, the relaxation oscillation type has a problem that it is difficult to determine whether there is a touch in an in-cell type touch panel.

The relaxation oscillation type is a very useful structure in a single self-capacitive type. However, a parasitic capacitance is generated between self-capacitances in the in-cell touch panel, and thus, when the same voltage is not provided, the parasitic capacitance value is greatly changed. For this reason, crosstalk occurs, and a unique value of the self-capacitance is changed, whereby it becomes difficult to determine whether there is a touch.

To provide an additional description, in the related art relaxation oscillation type, as shown in FIG. 3, a current is supplied to each of a plurality of touch electrodes to increase a voltage of each touch electrode to a predetermined touch voltage, and then whether there is a touch is determined by counting a time when the touch voltage is again dropped. The time when the touch voltage is dropped varies according to whether there is a touch, and thus, whether there is a touch may be determined by using a time difference. The above-described operation may be repeated several times for increasing the time difference. In FIG. 3, a method that counts the time when the operation is repeated four times is illustrated.

However, when a touch is made in plurality in a plurality of touch electrodes or a touch is made in one of a plurality of touch electrodes, touch electrodes adjacent to a touch electrode in which a touch occurs are affected by a capacitance change of the touch electrode in which the touch occurs. For this reason, an abnormal touch can be detected even in the adjacent touch electrodes.

SUMMARY

Accordingly, the present invention is directed to providing a display device and a driving method thereof that substantially obviate one or more problems due to limitations and disadvantages of the related art.

An aspect of the present invention is directed to providing a display device and a driving method thereof which, when an average voltage of touch electrodes reaches a predetermined reference voltage by supplying a current to the touch electrodes, can determine whether the touch electrodes are touched while respective touch voltages of the touch electrodes are being held.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a display device including: a panel in which a self-capacitive touch panel including a plurality of touch electrodes is built; and a touch sensing unit configured to, during a touch sensing period in one frame period, supply a current to the touch electrodes, hold touch voltages of the respective touch electrodes when an average voltage of the touch electrodes reaches a predetermined reference voltage, and compare each of the touch voltages with a slope voltage to determine whether each of the touch electrodes is touched while the touch voltages are being held.

In another aspect of the present invention, there is provided a method of driving a display device, including: during a touch sensing period in one frame period, supplying a current to a plurality of touch electrodes, and when an average voltage of the touch electrodes reaches a predetermined reference voltage, holding touch voltages of the respective touch electrodes; and comparing each of the touch voltages with a slope voltage to determine whether each of the touch electrodes is touched while the touch voltages are being held.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 8 is a timing diagram showing a touch voltage and a slope voltage applied to the display device according to the second embodiment of the present invention.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

Hereinafter, embodiments of the present invention will be described in detail with reference to the accompanying drawings. In the following description, for convenience of description, an LCD device will be described as an example of the present invention, but the present invention is not limited thereto. That is, the present invention may be applied to various display devices that display an image by using a common electrode and a common voltage.

Figure 1:
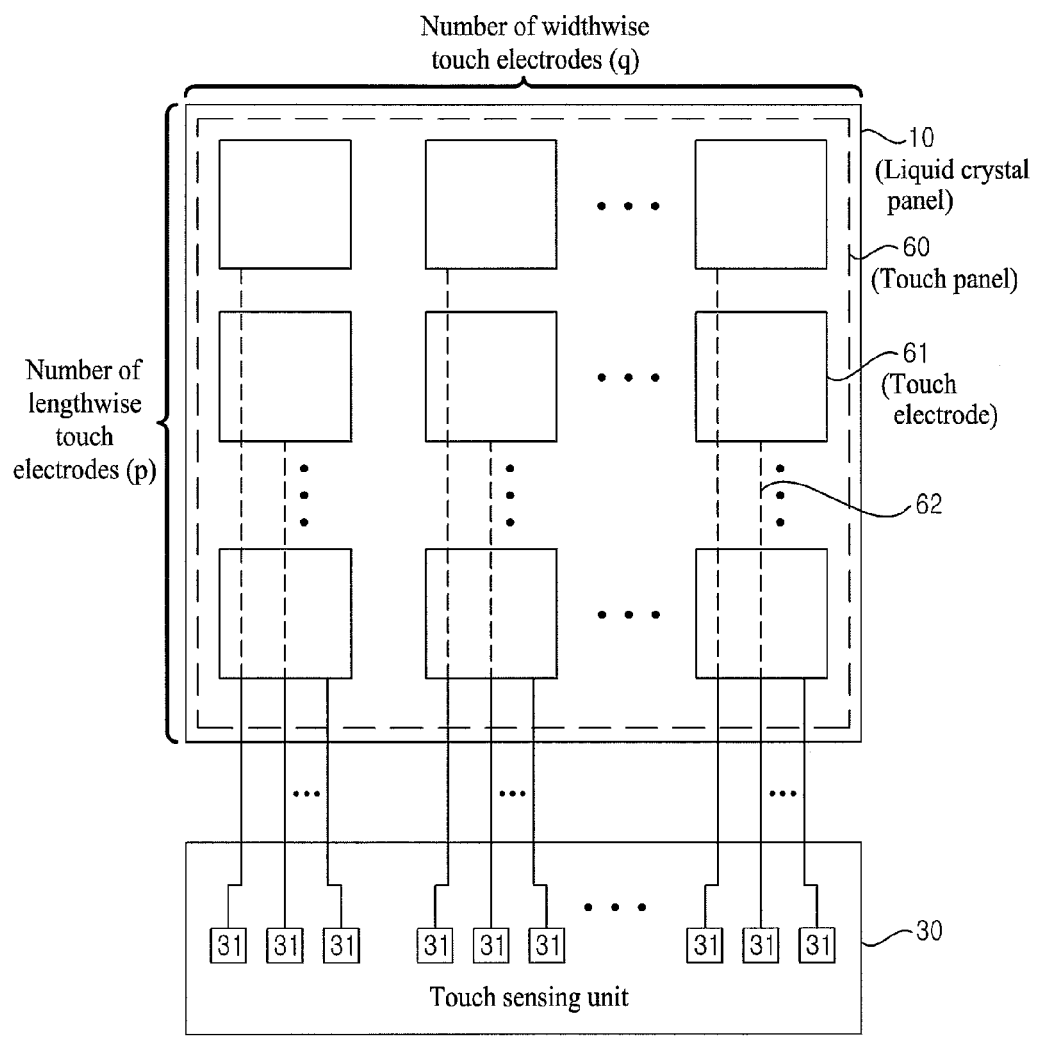
FIG. 1 is an exemplary diagram illustrating a configuration of a related art LCD device.
Figure 2:
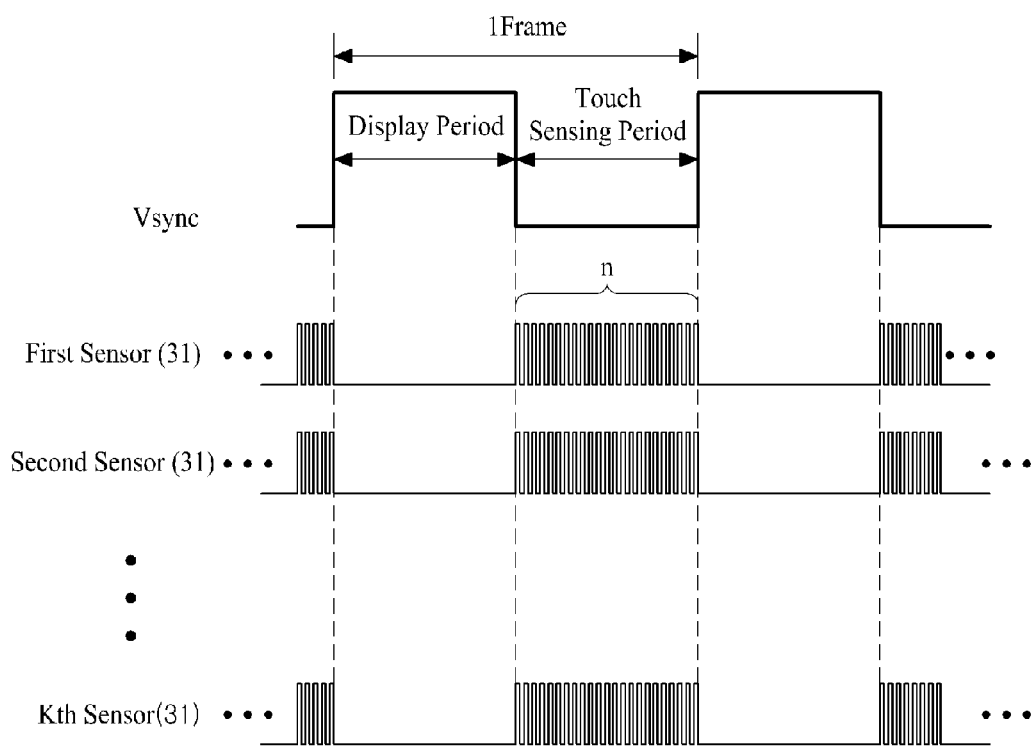
FIG. 2 is an exemplary diagram showing a timing at which a common voltage and a driving pulse are applied to a touch electrode in the related art LCD device.
Figure 3:
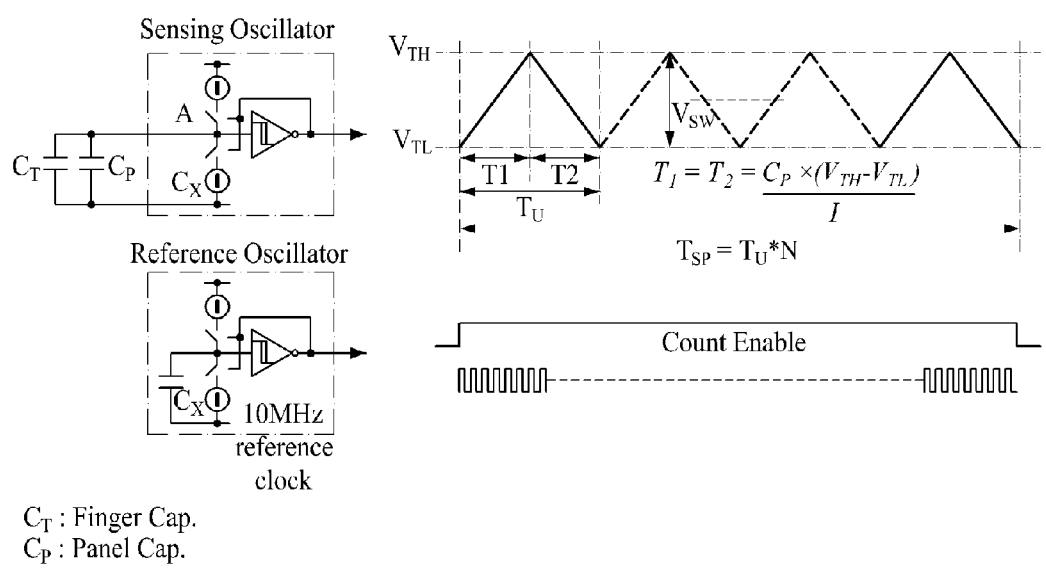
FIG. 3 is a graph for describing a method of determining a touch in a related art display device using a self-capacitive type.
Figure 4:
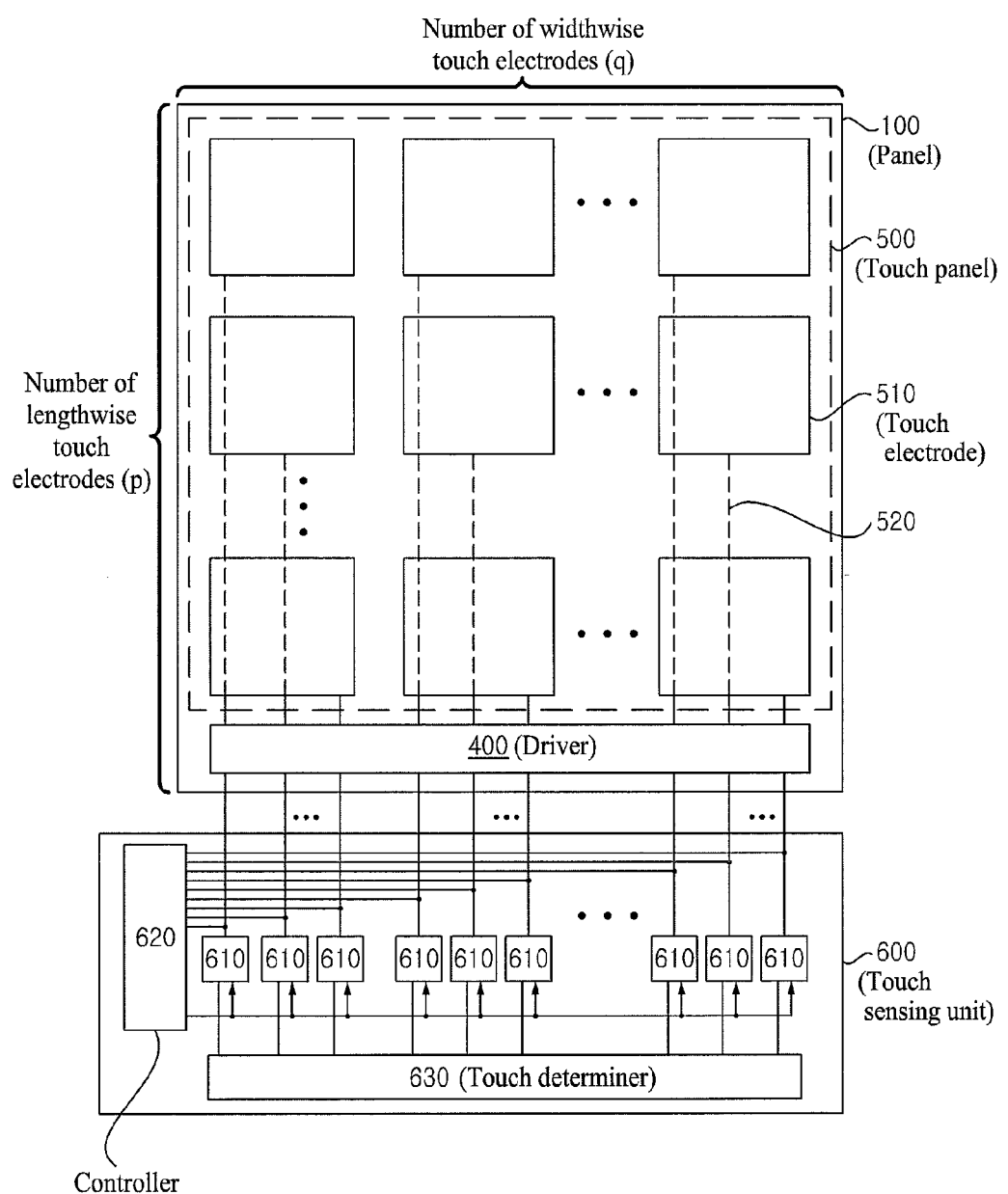
FIG. 4 is an exemplary diagram schematically illustrating a configuration of a display device according to the present invention.

FIG. 4 is an exemplary diagram schematically illustrating a configuration of a display device according to the present invention.

The present invention relates to a hybrid in-cell or in-cell type display device. In a method of driving a touch panel in the display device with the built-in touch panel, there are a resistive type and a capacitive type.

The capacitive type may be again categorized into a self-capacitive type and a mutual type. The present invention uses the self-capacitive type.

An LCD device according to the present invention, as illustrated in FIG. 4, includes: a panel 100 in which a plurality of pixels defined by intersections between a plurality of data lines and a plurality of gate lines are formed; a plurality of touch electrodes 510 that are built into the panel 100; a self-capacitive touch panel 500 in which a plurality of touch electrode lines 520 respectively connected to the plurality of touch electrodes are formed; a touch sensing unit 600 that, during a touch sensing period in one frame period, supplies a current to the touch electrodes, holds touch voltages of the respective touch electrodes when an average voltage of the touch electrodes reaches a predetermined reference voltage, and compares each of the touch voltages with a slope voltage to determine whether each of the touch electrodes is touched while the touch voltages are being held; and a driver 400 that outputs image signals to the respective data lines formed in the panel 100, outputs a scan signal to the gate lines, and outputs a common voltage to the touch electrodes.

The self-capacitive touch panel 500 with the plurality of touch electrodes 510 formed therein is built into the panel 100.

The panel 100 may be changed depending on the kind of display device, and particularly, when the display device is an LCD device, the panel 100 may be a liquid crystal panel in which a liquid crystal layer is formed between two glass substrates.

In this case, a plurality of data lines, a plurality of gate lines intersecting the plurality of data lines, a plurality of thin film transistors (TFTs) respectively formed in a plurality of intersection areas between the plurality of gate lines and the plurality of data lines, a plurality of pixel electrodes for charging a data voltage into a corresponding pixel, and the plurality of touch electrodes 510 for driving liquid crystal charged into the liquid crystal layer together with a corresponding pixel electrode are provided at a lower glass substrate of the panel 100. Here, a plurality of the pixels are arranged in a matrix type by an intersection structure of the data lines and the gate lines. A plurality of black matrixes (BM) and a plurality of color filters are formed at an upper glass substrate of the panel 100.

The present invention relates to a display device with a built-in touch panel in which the touch electrodes 510 configuring the touch panel 500 are included in the panel 100 as described above.

The touch panel 500 performs a function of determining whether there is a user's touch, and particularly, the touch panel 500 applied to the present invention uses the capacitive type using the self-capacitive type. The touch panel 500 includes the plurality of touch electrodes 510 and the plurality of touch electrode lines 520.

The plurality of touch electrodes 510 may be provided all over the plurality of pixels formed in the panel 100. The touch electrodes 510 generate respective touch voltages that increase to a predetermined average voltage with a current applied from the touch sensing unit 600 to enable determination of whether there is a touch, during the touch sensing period. During a display period, the touch electrodes 510 drive the liquid crystal together with a corresponding pixel electrode formed in a corresponding pixel.

Each of the plurality of touch electrode lines 520 is connected to a corresponding touch electrode 510, and a distal end thereof is connected to the touch sensing unit 600.

The touch panel 500 applied to the present invention, as described above, uses the capacitive type, and is built into the panel 100. That is, the touch electrodes 510 of the touch panel 500 applied to the present invention acts as a common electrode for driving the liquid crystal together with a corresponding pixel electrode, and are provided in the panel 100.

The driver 400 may be configured with a gate driver for controlling signals inputted to the respective gate lines, a data driver for controlling signals inputted to the respective data lines, and a timing controller for controlling the gate driver and the data driver. The gate driver, data driver, and timing controller configuring the driver 400 may be configured as one integrated circuit (IC) as illustrated in FIG. 4, or may be provided separately.

The timing controller receives a timing signal, including a data enable signal (DE), a dot clock (CLK), etc., from an external system to generate control signals (GCS and DCS) for controlling an operation timing of each of the data driver and gate driver. Also, the timing controller realigns video data inputted from the external system to output the realigned image data to the data driver.

The timing controller may control the data driver and the gate driver. Further, the timing controller may generate a control signal for controlling an input/output operation timing of the touch sensing unit 600 and control signals for enabling the touch sensing unit 600 to apply one of the common voltage and the driving pulse to the touch electrodes, and transfer the control signals to the touch sensing unit 600.

That is, the common voltage outputted to the touch electrodes 510 may be generated by a common voltage generator and outputted through the driver 400, or may be outputted through the touch sensing unit 600 receiving the control signal from the driver 400. Also, the driving pulse may be outputted through the touch sensing unit 600 receiving the control signal from the driver 400.

The data driver converts the image data, inputted from the timing controller, into analog data voltages, and supplies the data voltages for one horizontal line to the respective data lines at every one horizontal period in which the scan signal is supplied to the gate lines.

The gate driver shifts a gate start pulse (GSP) transferred from the timing controller according to a gate shift clock (GSC) to sequentially supply a gate-on voltage (Von) to the gate lines (GL1 to GLn).

Finally, as described above, during the touch sensing period in one frame period, the touch sensing unit 600 supplies a current to the touch electrodes, holds touch voltages of the respective touch electrodes when an average voltage of the touch electrodes reaches the predetermined reference voltage, and compares each of the touch voltages with the slope voltage to determine whether each of the touch electrodes is touched while the touch voltages are being held.

That is, during the touch sensing period in one frame period, the touch sensing unit 600 supplies a current to the touch electrodes 510 until an average voltage of the touch electrodes 510 reaches the predetermined reference voltage. When the average voltage reaches the predetermined reference voltage, the touch sensing unit 600 holds the touch voltages of the respective touch electrodes, and compares each of the touch voltages with the slope voltage to determine whether each of the touch electrodes is touched while the touch voltages are being held.

To this end, as illustrated in FIG. 4, the touch sensing unit 600 includes a plurality of comparators 610, a controller 620, and a touch determiner 630.

A detailed function and operation method of the touch sensing unit 600 will be described in detail with reference to FIGS. 4 to 8.

Figure 5:
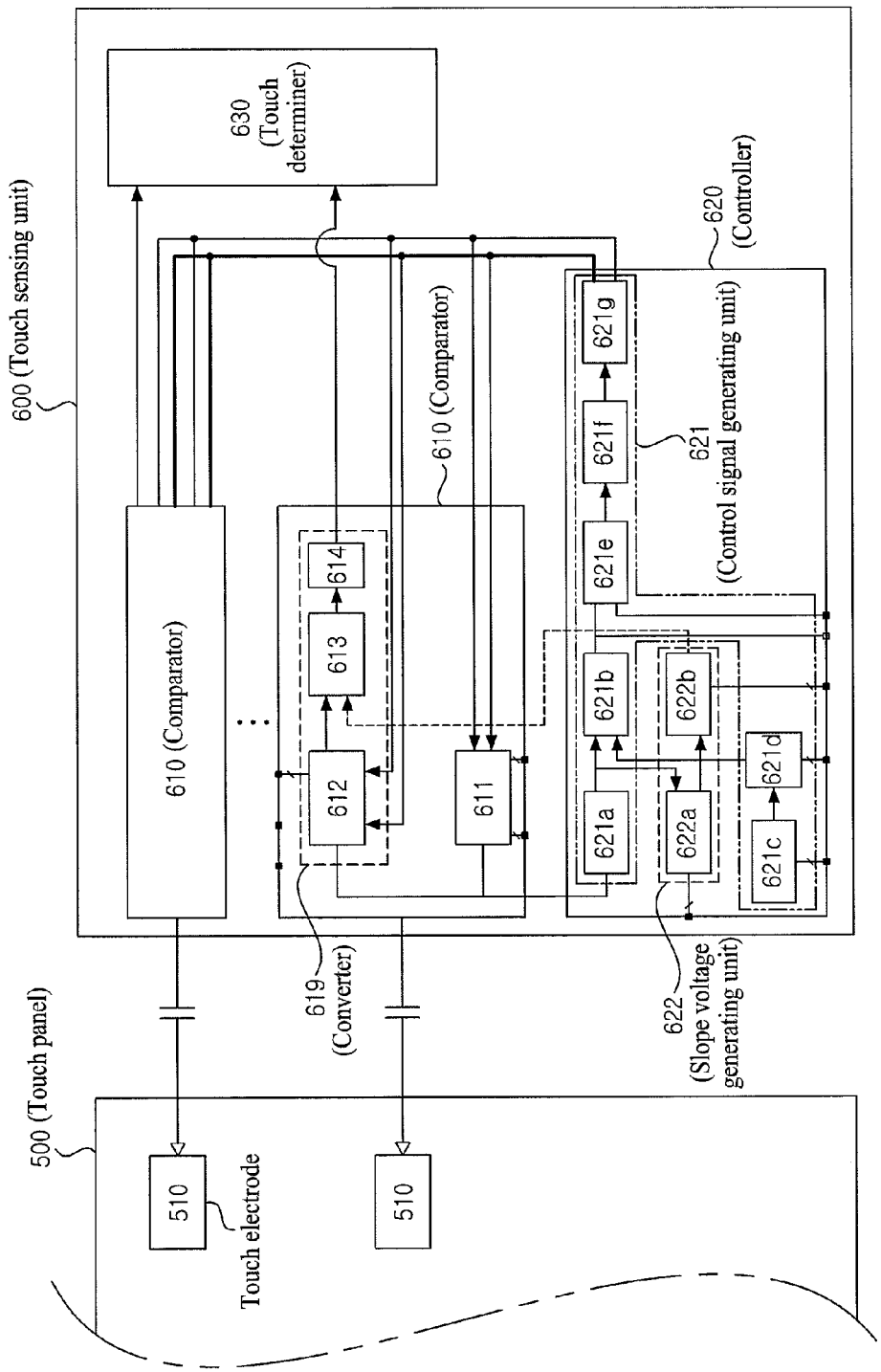
FIG. 5 is an exemplary diagram illustrating an internal configuration of a touch sensing unit applied to a display device according to a first embodiment of the present invention.
Figure 6:
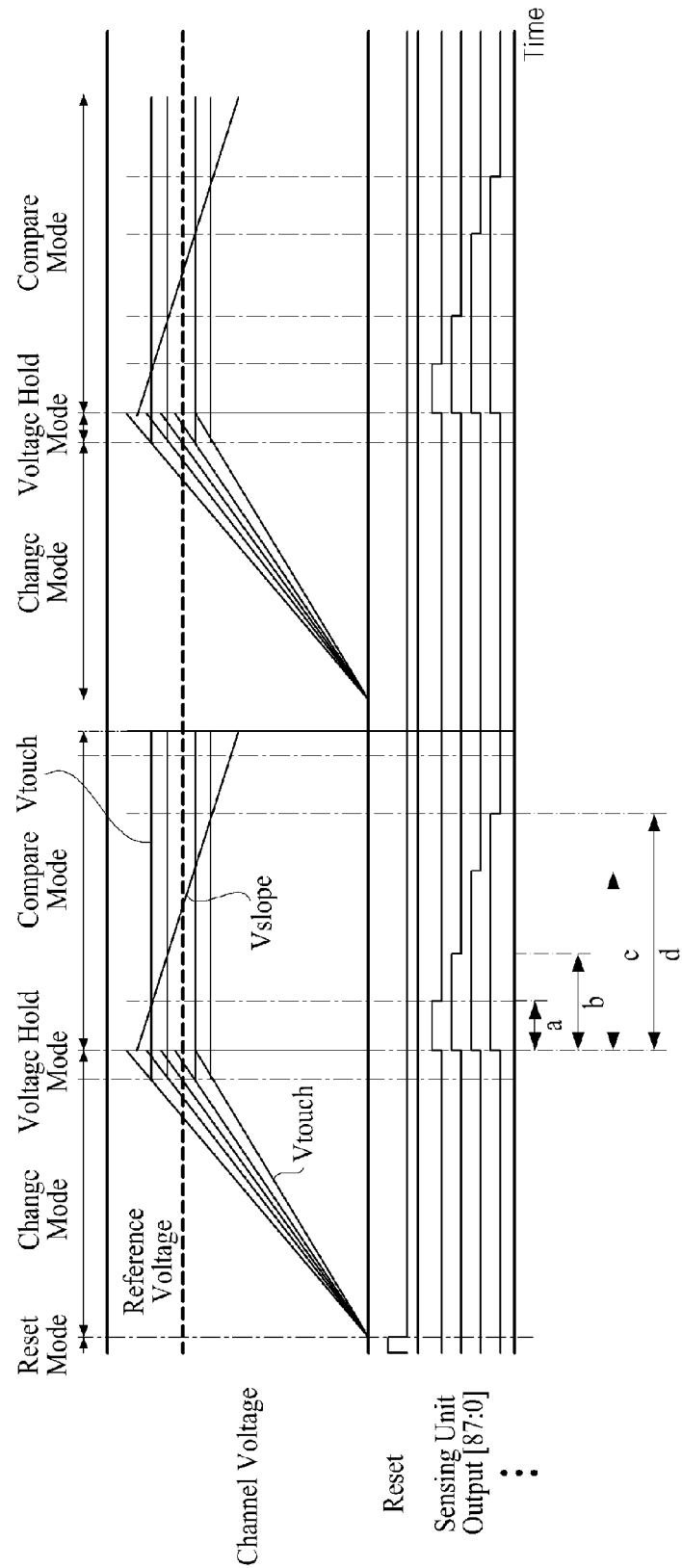
FIG. 6 is a timing diagram showing a touch voltage and a slope voltage applied to the display device according to the first embodiment of the present invention.
Figure 7:
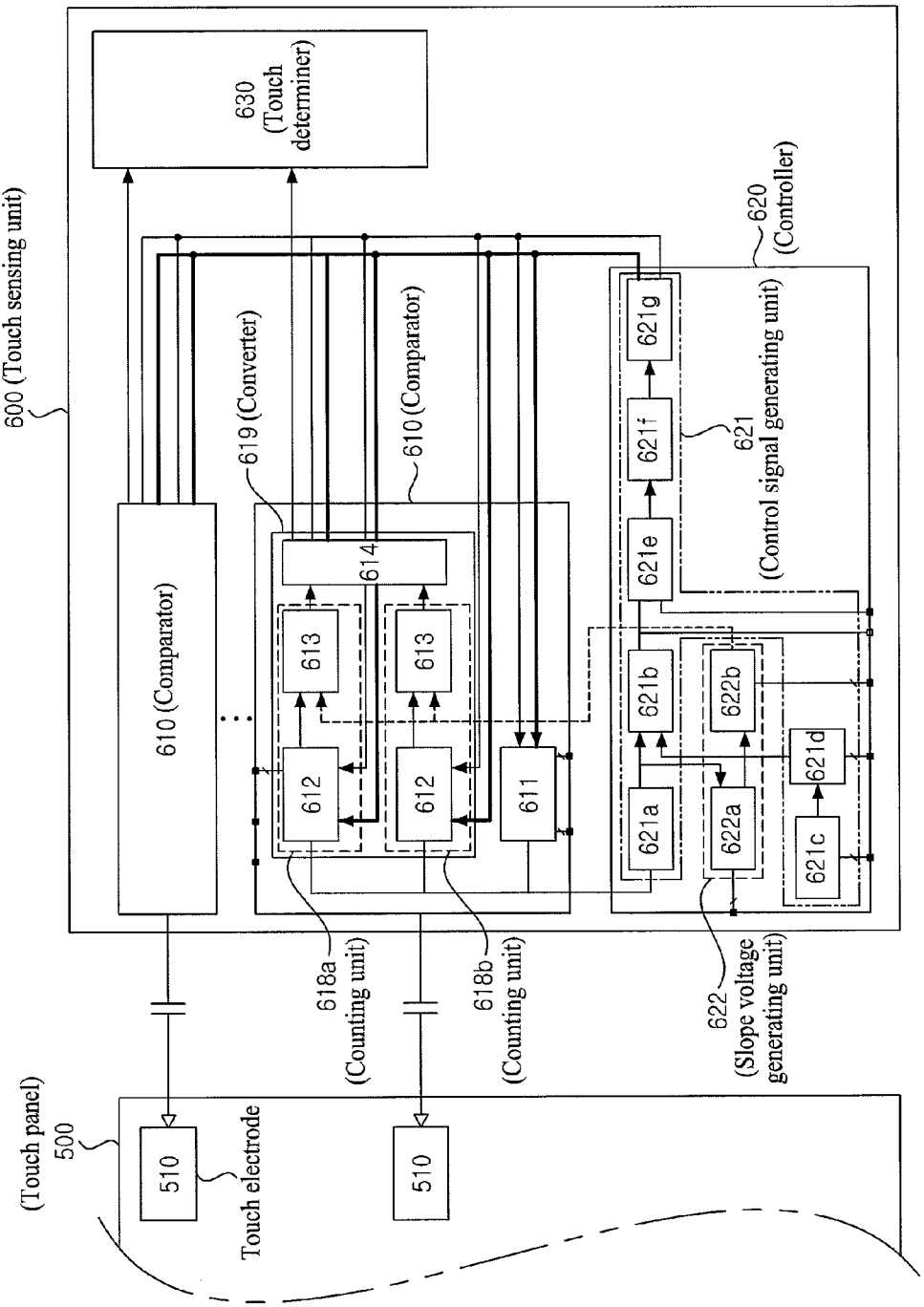
FIG. 7 is an exemplary diagram illustrating an internal configuration of a touch sensing unit applied to a display device according to a second embodiment of the present invention.

FIG. 5 is an exemplary diagram illustrating an internal configuration of a touch sensing unit 600 applied to a display device according to a first embodiment of the present invention, and FIG. 6 is a timing diagram showing a touch voltage and a slope voltage applied to the display device according to the first embodiment of the present invention. FIG. 7 is an exemplary diagram illustrating an internal configuration of a touch sensing unit 600 applied to a display device according to a second embodiment of the present invention, and FIG. 8 is a timing diagram showing a touch voltage and a slope voltage applied to the display device according to the second embodiment of the present invention.

The display device according to the present invention applies the common voltage to the touch electrodes 510 during the display period in one frame, and determines whether a touch occurs in the touch panel 500 by using the touch electrodes 510 during the touch sensing period in the one frame. A method, in which the common voltage is applied to the touch electrodes 510, may be variously implemented depending on a configuration and function of each of the driver 400 and touch sensing unit 630. Thus, the following description will focus on a function of determining whether a touch occurs in the touch panel 500 during the touch sensing period among functions of the display device according to the first embodiment of the present invention.

Hereinafter, in the configuration and function of the touch sensing unit 600 determining whether there is a touch, particularly, the configuration and function for determining whether there is the touch will be described in detail.

The touch sensing unit 600 applied to the display device according to the present invention, as illustrated in FIG. 5, includes: a plurality of comparators 610 that supply a current to each of the touch electrodes 510 according to a current supply control signal, hold a touch voltage Vtouch of each of the touch electrodes 510 according to a holding control signal, and compare the touch voltage Vtouch with a slope voltage Vslope to generate counting information while the touch voltage is being held; a controller 620 that transfers the current supply control signal to the comparator 610 when a timing for supplying the current to the touch electrodes 510 arrives, transfers the holding control signal to the comparator 610 when a timing for holding the touch voltage Vtouch arrives, and transfers the slope voltage Vslope to the comparator 610 together with the holding control signal; and a touch determiner 630 that determines whether each of the touch electrodes 510 is touched by using the counting information transferred from the comparators 610.

The comparators 610 are connected to the touch electrodes 510 in one-to-one correspondence relationship. Each of the comparators 610 includes: a converter 619 that holds the touch voltage Vtouch of a corresponding touch electrode 510 according to the holding control signal, counts until the touch voltage Vtouch and the slope voltage Vslope have the same value while the touch voltage Vtouch is being held, converts the counted value into the counting information, and outputs the counting information; and a charge pump 611 that supplies or does not supply a current to the touch electrode 501 according to the current supply control signal.

The converter 619 includes: at least one or more counting units 618a and 618b that hold the touch voltage Vtouch of the touch electrode 510 according to the holding control signal, and count until the touch voltage Vtouch and the slope voltage Vslope have the same value while the touch voltage Vtouch is being held; and an output unit 614 that converts at least one or more counted values into the counting information, and outputs the counting information to the touch determiner 630.

Each of the at least one counting units 618a and 618b includes: a holder (S/H) 612 that holds the touch voltage Vtouch according to the holding control signal; and a comparator 613 that, while the touch voltage Vtouch is being held, compares the touch voltage Vtouch with the slope voltage Vslope transferred from the controller 620, and counts until the touch voltage Vtouch and the slope voltage Vslope have the same value.

In the display device according to the first embodiment of the present invention, as illustrated in FIG. 5, only one counting unit 618a is provided in the converter 619. In this case, as shown in FIG. 6, a section in which the touch voltage Vtouch rises does not overlap a section in which the slope voltage Vslope falls.

In the display device according to the second embodiment of the present invention, as illustrated in FIG. 7, two counting units 618a and 618b are provided in the converter 619. In this case, as shown in FIG. 8, the section in which the touch voltage Vtouch rises may overlap the section in which the slope voltage Vslope falls.

In addition to the first and second embodiments, the converter 619 applied to the display device according to the present invention may include various number of counting units.

As the number of counting units increases, sensing may be more performed, and thus, whether there is a touch can be determined more accurately.

The output unit 614 converts the value counted by the comparator 613 into the counting information, and outputs the counting information to the touch determiner 630. That is, a count value generated by the comparator 613 is converted into digital information, which is transferred to the touch determiner 630.

The charge pump 611 supplies or does not supply a current to the touch electrode 501 according to the current supply control signal. That is, as shown in FIGS. 6 and 8, the charge pump 611 supplies the current to the touch electrode 510 to increase the touch voltage Vtouch of the touch electrode 510 in a charge mode during the touch sensing period.

The touch determiner 630 determines whether the touch electrodes 510 are touched by using the counting information transferred through the output unit 614 of each of the comparators 610.

Finally, when a timing for supplying the current to the touch electrode 510 arrives, the controller 620 transfers the current supply control signal to the comparator 610, and when a timing for holding the touch voltage Vtouch arrives, the controller 620 transfers the holding control signal to the comparator 610, and transfers the slope voltage Vslope to the comparator 610 together with the holding control signal.

To this end, the controller 620 includes: a control signal generating unit 621 that, when an average voltage of the touch electrodes calculated by using the touch voltages Vtouch detected from the respective touch electrodes 510 reaches the predetermined reference voltage Vref, transfers the current supply control signal and the holding control signal to the comparators 610; and a slope voltage generating unit 622 that, when the holding control signal is applied to the comparators 610, applies the slope voltage Vslope to the comparators 610.

The control signal generating unit 621 includes: an average voltage calculator 621a that calculates an average voltage of the touch electrodes 510 by using the touch voltages Vtouch detected from the respective touch electrodes 510; a digital-to-analog converter (DAC) 621d that stores information on the reference voltage Vref; a driving unit 621c that controls driving of the DAC 621d; a reference voltage comparator 621b that compares the average voltage with the reference voltage to determine whether the average voltage is the same as the reference voltage; a selector 621e that, when the average voltage is the same as the reference voltage as the compared result by the reference voltage comparator 621b, selects and generates a specific signal; a shift register 621f that sequentially shifts the signal generated from the selector 621e; and a timing generator 621g that generates the current supply control signal and the holding control signal according to the signal transferred through the shift register 621f; and transfers the current supply control signal and the holding control signal to the comparators 610.

The slope voltage generating unit 622 includes: a gain buffer 622a that prepares to generate the slope voltage when the average voltage increases to a certain level; and a slope voltage generator 622b that generates the slope voltage Vslope according to the signal transferred from the gain buffer 622a.

Hereinafter, a method of driving the display device according to the present invention will be described in detail with reference to FIGS. 6 and 7. Here, as described above, in the second embodiment of the present invention illustrated in FIGS. 7 and 8, the two counting units 618a and 618b are provided in the comparator 610. Therefore, except that a partial section of the slope voltage Vslope overlaps a partial section of the touch voltage Vtouch, the second embodiment of the present invention is the same as the first embodiment of the present invention illustrated in FIGS. 5 and 6. Thus, the first embodiment of the present invention will be described below.

First, during the touch sensing period in one frame, the comparator 610 supplies a current to the touch electrode 510 according to the current supply control signal transferred from the controller 620. Therefore, as shown in the charge mode of FIG. 6, the touch voltages Vtouch of the touch electrode 510 rise.

Before supplying a current to the touch electrodes 510, an operation of removing a current remaining in the touch electrodes 510 may be performed. That is, in a reset mode shown in FIG. 6, by applying a certain voltage to each initial channel (a touch electrode), an electric charge of the touch electrode is set to 0.

The average voltage calculator 621a of the control signal generating unit 621 configuring the controller 620 calculates an average voltage of the touch voltages by using the touch voltages Vtouch transferred from the respective touch electrodes 510.

The control signal generating unit 621 of the controller 620 determines whether the average voltage of the touch voltages is the same as the predetermined reference voltage Vref.

When it is determined that the average voltage is the same as the predetermined reference voltage, the controller 620 generates the current supply control signal for preventing the supply of the holding control signal and the current, and transfers the current supply control signal to the comparator 610.

The charge pump 611 receiving the current supply control signal prevents the supply of the current, and the holder 612 holds the touch voltage Vtouch of the touch electrode 510 in a voltage hold mode shown in FIG. 6. Therefore, the touch voltages Vtouch which increase the respective touch electrodes are maintained at a constant level.

The controller 620 transfers the slope voltage Vslope to the comparators 610.

The converter 619 counts a period until the touch voltage Vtouch becomes equal to the slope voltage Vslope, in a compare mode shown in FIG. 6. The counted value is converted into counting information, which is transferred to the touch determiner 630.

That is, although the current is applied to the touch electrodes 510 up to the average voltage of the touch voltages, a level of the touch voltage of each touch electrode 510 may be changed according to whether each touch electrode 510 is touched. For example, as shown in FIG. 6, immediately when the average voltage reaches the reference voltage Vref, the touch voltages of the respective touch electrodes 510 have different values according to whether there is a touch.

Therefore, times respectively taken until the touch voltages Vtouch become equal to the slope voltage Vslope differ as referred to as a, b, c, and d in the compare mode of FIG. 6.

Finally, the touch determiner 630 determines whether there is a touch for each touch electrode 510 by using the counting information transferred from the comparators 610.

The above-described details will be summarized as follows.

The present invention injects a certain electric charge into each channel (a node connected to the touch electrode) of the in-cell type touch panel having the self-capacitive type to calculate an average voltage of the touch voltages generated from the respective touch electrodes, and determines whether each of the touch electrodes is touched according to a difference between times taken until the touch voltages become equal to the slope voltage. To this end, the present invention performs the following functions.

First, in the reset mode, the present invention sets an electric charge of each touch electrode to 0 by applying a certain voltage to each initial channel (the touch electrode).

Second, in the charge mode, the present invention injects a certain current into the touch electrodes having an electric charge of 0 by using the charge pump 611 to linearly increase the touch voltages.

Third, in the voltage hold mode, the present invention holds the touch voltages at a time when the average voltage of touch voltages, which linearly increase as a current increases, reaches the reference voltage Vref.

Fourth, in the compare mode, the present invention compares the held touch voltages with the slope voltage having a slope to output a change value based on a touch as a digital code.

Particularly, as illustrated in FIGS. 7 and 8, a converter 619 of one comparator 610 includes two counting units 618a and 618b that include a holder 612 and a comparator 613, and the elements may operate at an odd time and an even time. The operation is called a pipe line operation. According to such an operation, a touch sensing function for touch sensing is performed together for a certain time, and thus, a loss time can be reduced.

The present invention injects an electric charge into the touch electrodes 510 for a certain time, compares the touch voltages and the slope voltage, and discharges the touch voltages. Accordingly, in the in-cell touch panel having the self-capacitive type, a mutual parasitic capacitance between the touch electrodes can be removed.

According to the present invention, since the mutual parasitic capacitance is removed, voltage distortion caused by crosstalk does not occur.

Since the present invention compares the touch voltages (which have linearly increased in the charge mode) with the slope voltage having a certain slope, a touch detection function can be enhanced according to a slope of the slope voltage.

According to the present invention, the touch voltages in the respective touch electrodes 510 are compared with the slope voltage after being short-circuited from the outside in the compare mode, an external noise is not inputted. Accordingly, the touch detection function can be enhanced.

In the present invention, as illustrated in FIGS. 7 and 8, since a pipe line sensing structure cannot be applied to the present invention, sensing can be performed without time being lost.

Since a certain electric charge is continuously injected into the touch electrodes until the average voltage of touch voltages of the touch electrodes (channels) reaches the reference voltage, the present invention can better prevent a touch sensing miss caused by an external noise than the related art method that injects an electric charge for a certain time.

According to the present invention, an immunity to a high frequency noise or a peak noise is enhanced for a certain charge injection time due to a response time of the average voltage calculator 621a generating the average voltage, and a signal-to-noise ratio (SNR) can be enhanced.

As described above, when an average voltage of touch electrodes reaches a predetermined reference voltage by supplying a current to the touch electrodes, the present invention determines whether the touch electrodes are touched while respective touch voltages of the touch electrodes are being held, thus decreasing respective influences of adjacent touch electrodes on the touch electrodes.

That is, since the present invention determines whether the touch electrodes are touched when touch voltages of all the touch electrodes have increased to an average voltage, a noise component applied to each of the touch electrodes is reduced, and thus a touch sensitivity can be enhanced.

Generally, when a self-capacitance value is equal to or greater than 50 pF, an amount of capacitance changed by a touch is 0.5 pF to 0.9 pF. Therefore, the present invention can change a data value, based on a fine change in a capacitance, to a high value. Also, by accumulating the data value, the present invention can determine a fine capacitance change based on whether there is a touch.

Moreover, the present invention uses the sensing method that generates touch voltages of all the touch electrodes as an average voltage, and thus can enhance an SNR.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A display device comprising:
    a panel in which a self-capacitive touch panel comprising a plurality of touch electrodes is built;
    a driver configured to, during a display period in one frame period,
        output image signals to data lines formed in the panel,
        output a scan signal to gate lines, and
        output a common voltage to the plurality of touch electrodes; and
    a touch sensing unit configured to, during a touch sensing period in one frame period,
        continuously supply a current to the touch electrodes until an average voltage of touch voltages of the touch electrodes reaches a predetermined reference voltage,
        hold the touch voltages of the respective touch electrodes when the average voltage of the touch electrodes reaches the predetermined reference voltage, and
        compare each of the touch voltages with a slope voltage having a slope to determine whether each of the touch electrodes is touched while the touch voltages are being held.

2. The display device of claim 1, wherein the touch sensing unit comprises:
    a plurality of comparators configured to supply a current to each of the touch electrodes according to a current supply control signal, hold the touch voltage of each of the touch electrodes according to a holding control signal, and compare the touch voltage with a slope voltage to generate counting information while the touch voltage is being held;
    a controller configured to transfer the current supply control signal to the comparator when a timing for supplying the current to the touch electrodes arrives, transfer the holding control signal to the comparator when a timing for holding the touch voltage arrives, and transfer the slope voltage to the comparator together with the holding control signal; and
    a touch determiner configured to determine whether each of the touch electrodes is touched by using the counting information transferred from the comparators.

3. The display device of claim 2, wherein each of the comparators comprises:
    a converter configured to hold the touch voltage of a corresponding touch electrode according to the holding control signal, count until the touch voltage and the slope voltage have the same value while the touch voltage is being held, convert the counted value into the counting information, and output the counting information; and
    a charge pump configured to supply or not to supply a current to the touch electrode according to the current supply control signal.

4. The display device of claim 3 wherein the converter comprises:
    at least one or more counting units configured to hold the touch voltage of the touch electrode according to the holding control signal, and count until the touch voltage and the slope voltage have the same value while the touch voltage is being held; and
    an output unit configured to convert at least one or more counted values into the counting information, and output the counting information to the touch determiner.

5. The display device of claim 2, wherein the controller comprises:
    a control signal generating unit configured to, when an average voltage of the touch electrodes calculated by using the touch voltages detected from the respective touch electrodes reaches the predetermined reference voltage, transfer the current supply control signal and the holding control signal to the comparators; and
    a slope voltage generating unit configured to, when the holding control signal is applied to the comparators, applies the slope voltage to the comparators.

6. A method of driving a display device including a touch panel having a plurality of touch electrodes, the method comprising:
    continuously supplying a current to the plurality of touch electrodes until an average voltage of touch voltages of the touch electrodes reaches a predetermined reference voltage during a touch sensing period in one frame period;
    holding the touch voltages of the respective touch electrodes when the average voltage of the touch electrodes reaches the predetermined reference voltage; and
    comparing each of the touch voltages with a slope voltage having a slope to determine whether each of the touch electrodes is touched while the touch voltages are being held.

7. The method of claim 6, wherein the continuously supplying of the current and the holding of the touch voltages comprises:
    supplying a current to each of the touch electrodes according to a current supply control signal; and
    holding the touch voltage of each of the touch electrodes according to a holding control signal.

8. The method of claim 7, wherein the holding of the touch voltages comprises:
    when a timing for holding the touch voltage arrives, generating the holding control signal;
    preventing the current from being supplied to the touch electrodes according to the holding control signal; and
    generating the slope voltage together with the holding control signal.

9. The method of claim 8, wherein the determining of whether each of the touch electrodes is touched comprises:
    counting until the touch voltages and the slope voltage have the same value while the touch voltages is being held;
    converting the counted value into the counting information; and
    determining whether each of the touch electrodes is touched by using the counting information.

10. The method of claim 6, wherein the continuously supplying of the current and the holding of the touch voltages comprise:
    supplying the current to the touch electrodes;
    when an average voltage of the touch electrodes calculated by using the touch voltages detected from the respective touch electrodes reaches the predetermined reference voltage, stopping the supply of the current; and when the average voltage of the touch electrodes reaches the predetermined reference voltage, holding the touch voltages, and then generating the slope voltage.

\* \* \* \* \*